Patented Nov. 21, 1922.

1,436,276

UNITED STATES PATENT OFFICE.

ABRAHAM T. MALMED, OF UPPER DARBY TOWNSHIP, DELAWARE COUNTY, PENNSYLVANIA.

REGULATING COMPOSITION FOR CEMENTITIOUS MATERIALS.

No Drawing.   Application filed June 1, 1921. Serial No. 474,254.

*To all whom it may concern:*

Be it known that I, ABRAHAM T. MALMED, a citizen of the United States, residing at 25 Overhill Road, Upper Darby Township, in the county of Delaware, and State of Pennsylvania, have invented certain new and useful Improvements in Regulating Composition for Cementitious Materials, of which the following is a specification.

This invention relates to certain new and novel compositions to be added to mortars or concretes made from Portland or other hydraulic cements for the purpose of so balancing, modifying or controlling the chemical reactions ensuing in the setting of the cement as to produce a set product possessing notably enhanced strength, density and homogeneity. The new and novel composition, according to my invention, comprises silica in soluble form, chlorides or other equivalent salt compositions and lime in the form of oxide or hydroxide united in the form of a dry, pulverized composition convenient for addition to cements, mortars or concretes.

It has been long recognized by students of cement that the lime content of Portland and other cements ranging between 55% and 65% is in excess of the amount which may be properly utilized through combination during setting with the acid acting ingredients. Various endeavors have been made to produce cements of lower lime content but without success since conditions of manufacture of cement require the presence of an excess of lime to avoid production of a slag, which when pulverized and gauged with water, will be inert and nonhardening. The excessive content of lime in commercial cements is therefore necessary to obtain a product which will be unstable toward water. I have found that silicic acid containing bodies comprising an energizer have the property, when added to the extent of a few per cent to cement, mortars, or concretes, of so combining with the excess lime content of the cement as to greatly enhance its strength, not only at early periods, but after long periods as well. Various silicic acid containing bodies are suitable and may contain other ingredients as well, provided the same are not deleterious to cement. I have found diatomaceous earth very effective as the basis of my regulating composition. An illustrative analysis of such diatomaceous earth is as follows:

| | |
|---|---|
| Silica | 96.04% |
| Alumina | .70% |
| Iron oxide | .18% |
| Lime | Trace |
| Magnesia | Trace |
| Loss on ignition | 2.30% |

Various sorts of furnace slags containing high percentages of soluble silica may be effectively used as a base. A slag which gave notable results had the following composition:

| | |
|---|---|
| Silica | 38.06% |
| Alumina | 24.40% |
| Iron oxide | .32% |
| Lime | 34.26% |
| Magnesia | 2.11% |
| Loss on ignition | .62% |

Certain industrial wastes such as the well-known residue from the production of alumina has been found to be a suitable base for the regulating composition. This commonly shows approximately the following analysis:

| | |
|---|---|
| Silica | 44.38% |
| Alumina | 39.10% |
| Iron oxide | Trace |
| Lime | Trace |
| Magnesia | Trace |
| Loss on ignition | 16.03% |

An illustrative composition comprising infusorial earth as a source of silicic acid, commercial calcium chloride as an energizer and hydrated lime, whose function may be described as that of a carrier, consisted of 40 parts of infusorial earth, 30 parts of hydrated lime, 30 parts of calcium chloride, and had the following analysis:

| | |
|---|---|
| Silica | 41.03% |
| Alumina | .88% |
| Iron oxide | .34% |
| Lime | 36.08% |
| Magnesia | .59% |
| Chlorine | 14.81% |
| Loss on ignition | 6.06% |

This composition was added to concrete in the proportion of 5% by weight of the cement content. It was found to notably improve and enhance the homogeneity, plasticity, and flowability of the concrete, thus vastly facilitating its placing in the forms. The concrete, which was of the 1-2-4 proportion, comprising commercial Portland cement, and river sand and pebbles, hardened much more quickly and with less contraction and cracking and, at all ages up to one year, was notably harder and denser than concrete of like materials containing no regulating composition. Test specimens of the plain concrete and of the concrete containing the regulating composition gave the following compression tests:

| | Lbs. per sq. in. | |
|---|---|---|
| | Plain. | Treated. |
| 7 days | 1417 | 2035 |
| 28 " | 1891 | 3109 |
| 3 months | 2205 | 3670 |
| 6 " | 2290 | 3878 |
| 9 " | 2643 | 4185 |
| 1 year | 3001 | 4326 |

Owing to the narrow limitations governing the investigation of what transpires during the setting and hardening of cement, it was impossible to state with certainty the exact manner in which the reactions are modified by the presence of regulating composition which is the subject of my invention. Based upon the results of latest researches, it is believed that the silicic acid or silicic anhydride of the composition is enabled to unite or combine in a chemical sense with the excess or free lime of the cement forming additional quantities of calcium silicate possessing important cementitious properties. Apparently the alumina content of the regulating composition acts in a like manner to form calcium aluminates. While these reactions have been known to some extent to other investigators, their activity has been of a feeble nature and efforts to stimulate the reaction have been unsuccessful. The chloride content of the regulating composition is essential and appears to function as an energizer, possibly through its ability to free the various components in a nascent state in which they more readily may be combined. In producing the regulating composition commercially, calcium chloride is used in certain sections owing to its cheapness and availability. Many other chlorides are equally effective, such as zinc chloride, magnesium chloride, aluminum chloride, iron chloride and tin chloride. To react effectively, it is essential that the chloride used be a salt which readily ionizes in water solution. Certain sulphates, notably acid sulphates and persulphates of alkali and alkaline earth metals are also effective as energizers and under some circumstances may be used interchangeably with chlorides. The regulating composition may be self cementitious when gauged with water but is not necessarily capable of setting. One of the most important results obtained from the addition of my regulating composition to mortars and concretes, is the improvement of qualities other than strength, rate of hardening, etc. By the use of this invention, great improvement in plasticity is achieved which causes the concrete to flow through and into the forms with facility, thereby enabling it to readily reach and fill all angles and interstices of the forms.

The characteristics of concrete during the ordinary setting and hardening period of 60 or 90 days are modified so that apparently the shrinkage is reduced with partial or complete elimination of the cracking, checking and crazing characteristics of ordinary concrete. The presence of the regulating composition apparently promotes such complete union of the essential ingredients of the cement with the water and the acid acting constituents of the regulating composition as to densify it during the hardening period. This is especially important in the installation of concrete roads, streets, sidewalks, floors and plaster or stucco coats, in all of which cracking is unsightly and frequently detrimental to integrity.

It is, of course, to be understood that the regulating composition may be made in varying proportions of the illustrative materials mentioned in the foregoing. The regulating composition may be modified as to content of the essential ingredients according to the kind of work or class of cement for which it is to be used. The quantity of regulating composition to be added to concretes and mortars is dependent upon what it is desired to accomplish. By the addition to conventional concrete of 20% by weight of the regulating composition based upon the cement content, it is possible to obtain strength at 24 hours which ordinarily would require several weeks to develop, thus enabling machinery foundations and the like to be readily installed during the week end shut down without loss of production of machines. When a slower development of enhanced final strength is wanted, small quantities of the regulating composition may be used, as little as 1% being sufficient to accomplish distinct improvement. For general purposes, the addition of 5% or so, more or less of the regulating composition produces notable improvement in strength, plasticity, density, and also promotes setting without cracking and the like.

Having described the invention together with illustrative ingredients, proportions, and formulaes and methods of preparation, to the details of which disclosure the invention is not of course to be limited, what is claimed as new and what is desired to be secured by Letters Patent is set forth in the appended claims.

I claim:

1. The regulating composition for Portland cement capable of developing and greatly increasing the cementitious properties and strengths of Portland cement, mortars and concretes, containing available silicic acid and chloride energizing material, the silicic acid being present in such form as to be readily energized by the chloride material.

2. The regulating composition capable of developing and greatly increasing the cementitious properties and strengths of cement, mortars and concretes, containing available silicic acid and chloride energizing material, the silicic acid being present in such form as to be readily energized by the chloride material.

3. The regulating composition for Portland cement capable of developing and greatly increasing the cementitious properties and strengths of Portland cement, mortars and concretes, containing available silicic acid and energizing material, the silicic acid being present in such form as to be readily energized by the energizing material.

4. The regulating composition for Portland cement capable of developing and greatly increasing the cementitious properties and strengths of Portland cement, mortars and concretes, containing silica in soluble form and available energizing chloride material, the silica being present in such form as to be readily energized by the chloride material.

In testimony whereof, I affix my signature.

ABRAHAM T. MALMED.